Patented May 5, 1931

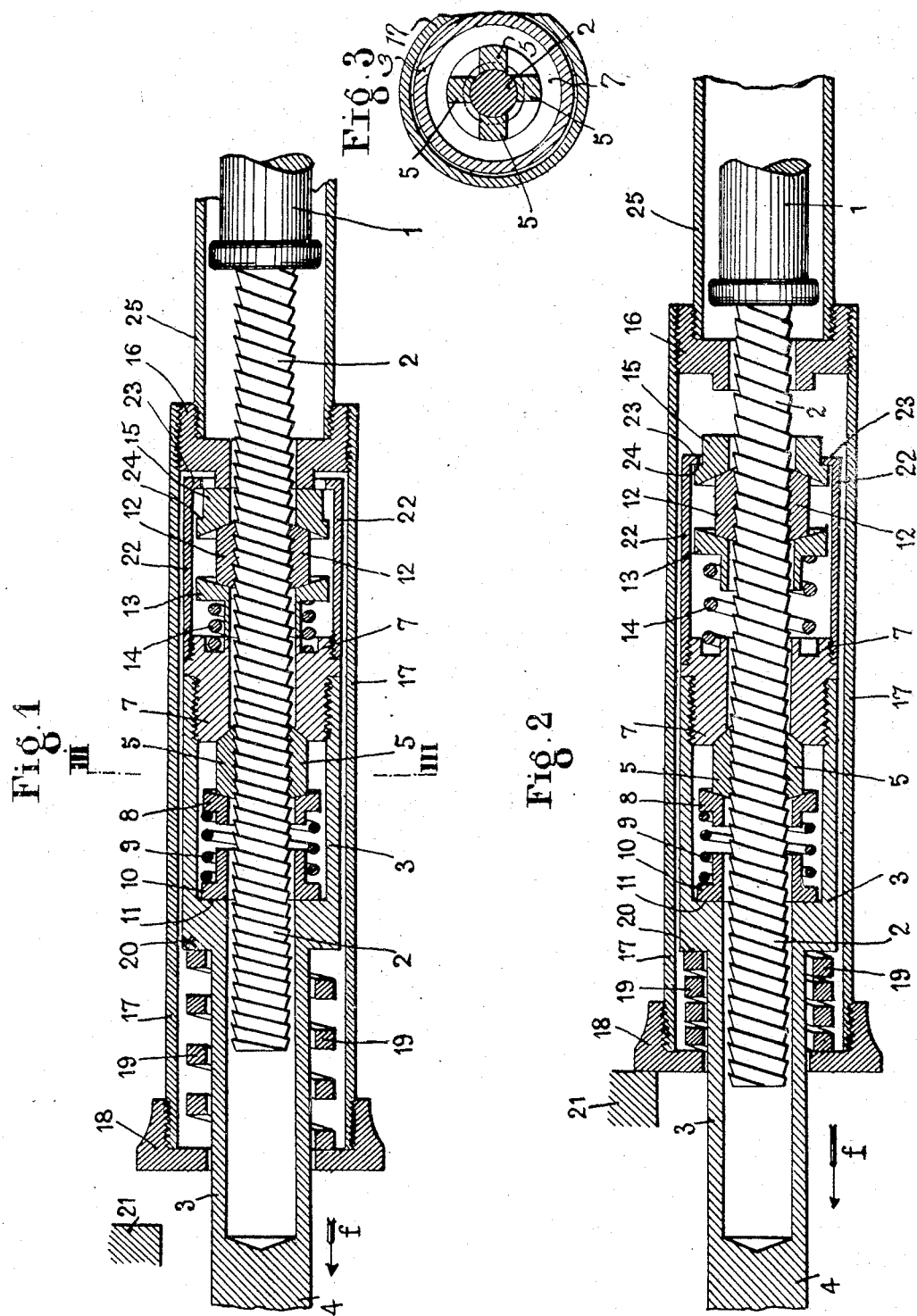

1,804,309

UNITED STATES PATENT OFFICE

OLIVIER BOURBEAU, OF PARIS, FRANCE

AUTOMATIC BRAKE ADJUSTING MECHANISM

Application filed May 31, 1930, Serial No. 456,514, and in France April 10, 1930.

This invention has for its subject improvements in devices for automatically regulating brake mechanism, especially for railway vehicles. The invention relates more particularly to devices of this type which are provided with a rod having at one end a circular rack or worm gearing with toothed jaws suitably secured to a sleeve which extends the rod. Under the action of a stationary stop, which comes into action when the longitudinal movement of the rod, during braking, exceeds a predetermined value, the said jaws can move relatively to the rod by one or more teeth, thus shortening the overall length of the rod and sleeve, these members forming one of the rods of the mechanism.

The improvements forming the subject of the present invention are for the purpose of avoiding untimely movements and adjustments which occur in devices hitherto known. For example when a push is applied to the rod provided with the worm the rod can be moved relatively to the jaws and consequently shorten the rod formed by the rod and sleeve.

Moreover when the braking operation is too sudden then by reason of the elasticity of the various parts of the mechanism the rod, provided with the adjusting device, has a longitudinal movement which is greater than that which it should have normally, and consequently the adjusting device moves the jaws and thus uselessly shortens the rod.

In accordance with the present invention it is possible to obviate any movement, except an adjusting movement, of the rod relatively to the sleeve, and this result is obtained by reason of the play of the jaws which form a nut, and in the case of adjustment it is possible to limit at will the movement of the jaws to one or two teeth irrespective of the longitudinal movement of the rod in such a manner that there is not obtained an excessive shortening of the rod. This result is obtained by a stop sleeve which limits, to the desired value, the movement of the adjusting jaws.

Other improvements reside in the provision of an adjusting device of the type above referred to having a cylindrical shape, without any external projection or lateral opening in such a manner that the mechanism is efficiently protected against dust and dirt.

In order that the invention may be readily understood it will be described hereinafter solely by way of example by one form of construction illustrated in the accompanying drawings, wherein:—

Figure 1 is an axial longitudinal section of the adjusting device in the normal position.

Figure 2 shows a similar section with the adjusting device in the position for tightening the brake, and Figure 3 is a cross section on the line III—III of Figure 1.

As shown in Figures 1 and 2 the assemblage of the adjustable rod is formed by a rod 1 provided at its free end with a screw thread or a circular rack 2, and a sleeve 3 provided at the end of a rod 4 forming an extension of the rod 1. The two rods 1 and 4 are connected together in such a manner that when a pull is exerted on one of them it pulls the other by means of four jaws 5 arranged in the form of a cross around the periphery of the screw portion 2 of the rod 1 (Figure 3) and held in engagement with the screw portion by two cylindro-conical members one of which 7 is directly screwed into the sleeve 3 and the other 8 is under the action of a spring 9. This spring bears at one end against a ring 10 resting against a shoulder 11 of the sleeve 3. The jaws 5 held in position by the cylindro-conical members 7 and 8 form a nut which holds the screw threaded rod 2 relatively to the sleeve 3 and transmits, particularly to the rod 1, any pulling effort exerted on the rod 4 in the direction of the arrow $f$.

The adjusting device itself comprises the jaws 12, four in number, disposed in the form of a cross around the screw threaded rod 2, a cylindro-conical member 13 being pressed against the jaws 12 by a spring 14 of which the other end bears against the right-hand end of the cylindro-conical member 7 and a cylindro-conical member 15 bearing against the stop sleeve 16. The latter is screwed into the end of a tube 17 which encloses the whole mechanism, and is provided at its other end with an outer stop 18.

A return pressure spring 19 bears at one end against the outer stop 18, and at the other end against a shoulder 20 of the sleeve 3, and normally holds the separate parts in the position shown in Figure 1, whilst compressing the spring 14 and bringng the conical ring 13 into engagement with the conical ring 7.

Under these conditions, when the brakes are being applied, then if the longitudinal movement of the rod is sufficent to bring the ring 18 in contact with a stop 21 secured to the chassis of the vehicle, that is to say if there is any wear of the brake shoes or in the rod, the tube 17 is stopped whilst the rod 4 moves to the left in the direction of the arrow f compressing the spring 19 whilst the sleeve 16 ceases to bear against the conical ring 15 and the spring 14 expands and pushes the four jaws 12 towards the right, these jaws moving on the screw portion 2 through a distance equal for example to one tooth.

At the moment of releasing the brakes the conical ring 15 and the sleeve 16 again press the jaws 12 to the right, the spring 9 expands and acting on the jaws 5 moves these to the right through a distance of one tooth, whilst compressing the spring 14. The whole mechanism will then again be in the position shown in Figure 1, but advanced by one tooth to the right having shortened the rod by a length equal to one tooth.

In the absence of any other device then in the case of a sudden application of the brakes the jaws 12 are capable of moving through a distance equal to a larger number of toothed spaces than is necessary. In order to prevent this there is screwed on the member 7 a sleeve 22 having at its end a flange 23 so arranged as to allow the end of the conical ring 15 to move therethrough during its movement to the right, but to stop the movement of this ring when a shoulder 24 thereon comes in contact with the flange 23.

From the foregoing it will be seen that irrespective of the compression of the spring 19 the movement of the jaws 12 relatively to the rod 2 is limited by the distance which separates, in the position of rest (Figure 1) the flange 23 and the shoulder 24, this distance being equal by construction to two tooth spaces for example. Thus in the course of sudden braking the movement of the tube 17 will take place in accordance with the complete compression of the spring 19 without influencing the value of the shortening of the play which has been fixed to two tooth spaces.

In the position of rest the jaws 12, firmly wedged between the conical rings 13 and 15 form a nut which prevents any movement to the left of the screw portion 2.

The device described is enclosed in a tube 17 and in a tube 25 passing around the rod 1, 2 for such a distance as is necessary. The device is thus efficiently protected and the rod provided with the adjusting device is as a whole cylindrical simply having parts of slightly larger diameter at the point of the adjusting device.

I claim:—

1. Mechanism for automatically adjusting the rods of brake mechanism comprising a rod provided at one end with a worm, a plurality of toothed jaws engaging with said worm, a sleeve arranged in alignment with said rod, said sleeve being adapted to hold said jaws in engagement with said worm, and means for limiting the relative movement between said rod and said sleeve.

2. Mechanism according to claim 1, wherein said means comprise an additional set of adjusting jaws adapted to engage with said worm, a stop connected to operating means for said last mentioned set of jaws, and a fixed stop for co-operating with said first mentioned stop, the arrangement being such that on the movement of said rod in one direction the additional set of jaws is adapted to slide over the worm when the two stops come into engagement with one another, and then said jaws remain in engagement with said worm, whilst the rod is moving in the opposite direction during which latter movement the first set of jaws slides over said worm through a distance corresponding with the distance moved over the worm by the additional set of jaws.

3. An automatic device for brake adjusting mechanism comprising a rod, a worm at one end of said rod, a sleeve extending in alignment with said rod and being adapted to receive said worm, two sets of jaws engaging said worm, a member screwed in the end of said sleeve between said sets of jaws, a spring located between said sleeve and one set of jaws, said spring normally pressing said jaws against said member, an abutment member and a spring located between the member screwed in said sleeve and the second set of jaws, said spring normally pressing the second set of jaws against said abutment member.

4. In a device for automatically adjusting brakes, a rod, a worm at one end of said rod, a sleeve arranged in alignment with said rod and adapted to receive the ends of said worm, two sets of jaws having conical surfaces and engaging with said worm, a member screwed in the end of said sleeve and surrounding said worm, said member having a conical surface for co-operating with the conical surface of the adjacent set of jaws, an annular member having a conical surface for co-operating with the conical surface on the other side of said jaws, a spring between said sleeve and said annular member, said spring being adapted to press said annular member against said jaws and consequently press said jaws against the member screwed in the end of said sleeve, an abutment member surrounding said worm, said abutment member having a conical surface for engagement with a conical surface on the adjacent jaws, a second annular member having a conical surface bearing against the conical surface of the corresponding jaws, and a spring located between the member screwed in the end of said sleeve and the second annular member, said spring being adapted to press the second annular member against the corresponding jaws, and consequently the latter against the abutment member, whereby the jaws are held in engagement with said abutment member.

5. Mechanism according to claim 1, wherein the worm is of such a shape that it enables the jaws to slide over it in one direction, but prevents the jaws from moving relatively thereto in the opposite direction.

6. Mechanism according to claim 1, wherein the worm is in the form of a conical screw having one side flat for engagement with a corresponding tooth face in said jaws, whilst the other side is inclined towards the axis of said screw.

7. In a device for automatically adjusting the length of a rod in brake operating mechanism, a rod, a worm at one end of said rod, a sleeve arranged in alignment with said rod and adapted to receive the end of said worm, said sleeve having an internal screw thread, a member screwed into said internal screw thread and surrounding said worm, a set of jaws located inside said sleeve and bearing against said member, a spring located between said sleeve and said jaws and normally pressing said jaws against said member, an abutment member surrounding said worm, a second set of jaws engaging said worm and bearing against said abutment member, a spring located between the member screwed in said sleeve and said second set of jaws and normally pressing said second set of jaws against the abutment member, and a pair of annular members located one between each spring and the corresponding jaws.

8. In a device for automatically adjusting the length of a rod in brake operating mechanism, a rod, a worm at one end of said rod, a sleeve arranged in alignment with said rod and adapted to receive the end of said worm, said sleeve having an internal screw thread, a member screwed into said internal screw thread and surrounding said worm, a set of jaws located inside said sleeve and bearing against said member, a spring located between said sleeve and said jaws and normally pressing said jaws against said member, an abutment member surrounding said worm, a second set of jaws engaging said worm and bearing against said abutment member, a spring located between the member screwed in said sleeve and said second set of jaws and normally pressing said second set of jaws against the abutment member, and a pair of annular members located one between each spring and the corresponding jaws, said jaws having inclined surfaces, and said member screwed into the sleeve, said abutment member and said annular members having internal conical surfaces for co-operation with the inclined surfaces on the jaws whereby the latter are pressed tightly into engagement with said worm.

9. In a device for automatically adjusting the length of a rod in brake operating mechanism, a rod, a worm at one end of said rod, a sleeve arranged in alignment with said rod and adapted to receive the end of said worm, said sleeve having an internal screw thread, a member screwed into said internal screw thread and surrounding said worm, a set of jaws located inside said sleeve and bearing against said member, a spring located between said sleeve and said jaws and normally pressing said jaws against said member, an abutment member surrounding said worm, a second set of jaws engaging said worm and bearing against said abutment member, a spring located between the member screwed in said sleeve and said second set of jaws and normally pressing said second set of jaws against the abutment member, and a pair of annular members located one between each spring and the corresponding jaws, a tube connected to said abutment member, an inwardly turned flange at one end of said tube, a stop on said tube adjacent said flange, a fixed stop for co-operating with the stop on said tube, and a spring located between said flange and said sleeve, said spring normally urging said sleeve towards said rod.

10. In a device for automatically adjusting the length of a rod in brake operating mechanism, a rod, a worm at one end of said rod, a sleeve arranged in alignment with said rod and adapted to receive the end of said worm, said sleeve having an internal screw thread, a member screwed into said internal screw thread and surrounding said worm, a set of jaws located inside said sleeve and bearing against said member, a spring located between said sleeve and said jaws and normally pressing said jaws against said member, an abutment member surrounding said worm, a second set of jaws engaging said worm and bearing against said abutment member, a spring located between the member screwed in said sleeve and said second set of jaws and normally pressing said second set of jaws against the abutment member, and a pair of annular members located one between each spring and the corresponding jaws, a stop member normally engaging said abutment member, a tube secured at one end to said stop member, an inwardly directed flange secured to the other end of said tube and surrounding said sleeve, a stop on said flange, a fixed stop for cooperation with said first mentioned stop, and a spring located in said tube between said flange and said sleeve.

11. In a device for automatically adjusting the length of a rod in brake operating mechanism, a rod, a worm at one end of said rod, a sleeve arranged in alignment with said rod and adapted to receive the end of said worm, said sleeve having an internal screw thread, a member screwed into said internal screw thread and surrounding said worm, a set of jaws located inside said sleeve and bearing against said member, a spring located between said sleeve and said jaws and normally pressing said jaws against said member, an abutment member surrounding said worm, a second set of jaws engaging said worm and bearing against said abutment member, a spring located between the member screwed in said sleeve and said second set of jaws and normally pressing said second set of jaws against the abutment member, and a pair of annular members located one between each spring and the corresponding jaws, a second sleeve secured to the member screwed into said sleeve, said second sleeve having at its free end an inwardly directed flange, said flange being adapted to co-operate with the abutment member so as to limit relative movement thereof in one direction.

12. In a device for automatically adjusting the length of a rod in brake operating mechanism, a rod, a worm at one end of said rod, a sleeve arranged in alignment with said rod and adapted to receive the end of said worm, said sleeve having an internal screw thread, a member screwed into said internal screw thread and surrounding said worm, a set of jaws located inside said sleeve and bearing against said member, a spring located between said sleeve and said jaws and normally pressing said jaws against said member, an abutment member surrounding said worm, a second set of jaws engaging said worm and bearing against said abutment member, a spring located between the member screwed in said sleeve and said second set of jaws and normally pressing said second set of jaws against the abutment member, and a pair of annular members located one between each spring and the corresponding jaws, a stop member normally engaging said abutment member, a tube secured at one end to said stop member, an inwardly directed flange secured to the other end of said tube and surrounding said sleeve, a stop on said flange, a fixed stop for co-operation with said first mentioned stop, and a spring located in said tube between said flange and said sleeve, a second tube secured to said stop member and surrounding said rod.

13. A device for automatically adjusting the length of a rod in brake operating mechanism comprising a rod, a worm secured to one end of said rod, a sleeve arranged in alignment with said rod and adapted to receive the end of said worm, a member secured in the end of said sleeve and surrounding said worm, a stop member surrounding said worm, two sets of jaws engaging said worm, one of said sets of jaws being arranged adjacent the member secured to the sleeve, whilst the second set of jaws is arranged adjacent said stop member, a spring located between the sleeve and the first set of jaws so as normally to press said jaws towards the member secured to said sleeve, and consequently pressing said jaws into engagement with said worm, a second spring between said member and said second pair of jaws, a tube connected to the stop member and surrounding said sleeve, a spring between said tube and said sleeve, and means for limiting the movement of said tube in one direction.

14. In mechanism for automatically adjusting the length of an operating rod in brake mechanism, a rod, a worm secured to one end of said rod, a second rod arranged in alignment with the first rod, a sleeve formed on the end of the second rod, said sleeve being adapted to receive the end of said worm, said sleeve having portions of two different internal diameters so as to form internal and external shoulders on said sleeve, an annular shouldered member bearing against the internal shoulder, a member screwed in the free end of said sleeve and having a conical seating therein, a pair of jaws having a conical outer surface engaging with said conical seating, an annular member having a conical seating and engaging with the other side of said jaws, a spring located between the shouldered annular member and the last mentioned annular member, a pair of annular members having conical seatings surrounding said worm, a second set of jaws located between said pair of annular members, said jaws having inclined outer surfaces for engagement with said sets, a spring located between one of the pairs of annular members and the member secured to the end of the sleeve, a second sleeve secured to said last mentioned member, said second sleeve having an inwardly turned flange for co-operation with a shoulder in one of the pair of annular members, a tube surrounding the end of said sleeve and the various annular members and the jaws, a flange member secured to one end of said tube, a spring between said flange and the external shoulder on the sleeve, a stop on said flange, a fixed stop for co-operating with the first mentioned stop, a stop member in the other end of said tube for co-operation with one of the pairs of annular members and a second tube secured to said stop member and surrounding said rod.

OLIVIER BOURBEAU.